May 1, 1951      F. O. WISMAN      2,551,306
AIRCRAFT ENGINE SYNCHRONIZER
Filed July 19, 1946
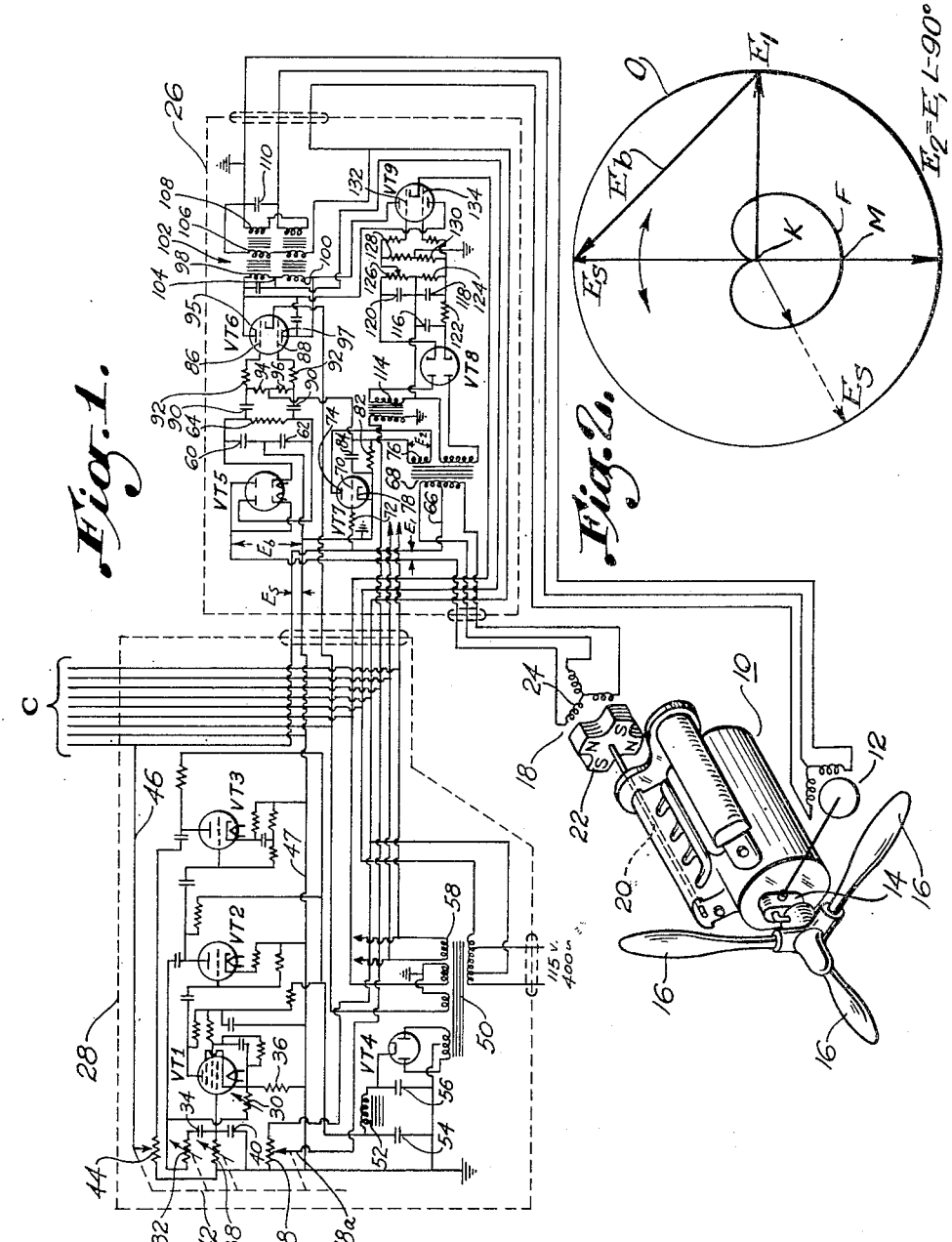
INVENTOR.
FRANKLIN O. WISMAN.
BY Cecil J Arens
ATTORNEY.

Patented May 1, 1951

2,551,306

UNITED STATES PATENT OFFICE 2,551,306

AIRCRAFT ENGINE SYNCHRONIZER

Franklin O. Wisman, South Bend, Ind., assignor to Bendix Aviation Corporation, South Bend, Ind., a corporation of Delaware Application July 19, 1946, Serial No. 684,807

3 Claims. (Cl. 175—355)

This invention relates to a governor and synchronizer for aircraft engines.

The desirability of synchronizing aircraft engines becomes more apparent as the number and size of the engines increases.

However, where each engine has its speed controlled independently of the other engine, the maintenance of exact speed synchronism between the engines on an aircraft demands continuous attention from the flight crew. Such an arrangement also requires the use of individual governors which results in a weight penalty in the duplication of the apparatus.

Since all engines are to operate at the same speed it seems only logical to establish a standard speed reference with which all the engines are synchronized.

It is, therefore, an important object of the invention to provide an electrically operated synchronizing device for a plurality of engines.

A further important object of the invention resides in the provision of a synchronizing apparatus for engines having a single electronic master governor the output of which is used as a standard speed reference with which individual engine speeds are matched.

A very important feature of the invention resides in the provision of an error measuring means capable of a high degree of sensitivity and not dependent on the calibration or strength of any circuit elements.

Another very important object of the invention resides in the provision of an electronic synchronizing apparatus for engines which compares individual engine signals which are a function of engine speed, with a standard reference signal, whereby the engine speeds are regulated to the speed reflected by the reference signal.

A still further important object of the invention resides in the provision of an electrically controlled engine synchronizing apparatus having two stages of synchronization, one of which is sensitive to speed differentials above a predetermined value and the other of which is sensitive to speed differentials below said predetermined value.

An important object of the invention resides in the provision of an electrically controlled engine synchronizing apparatus having a predetermined reference frequency which is connected in series with an engine driven alternator frequency to produce a beat frequency, the time derivative of which is impressed on an electrical device constructed and arranged to synchronize engine speed with the reference frequency.

The above and other objects and features of the invention will be apparent from the following description of the apparatus taken in connection with the accompanying drawings which forms a part of the specification, and in which:

Figure 1 is a circuit diagram of the device of the invention shown associated with a single aircraft engine; and Figure 2 is a vector diagram.

Referring to Figure 1, the reference numeral 10 designates an aircraft engine, the speed of which is to be synchronized with other engines, not shown. Since the speed of the engine is determined by propeller pitch, a motor 12 controlled in a manner hereinafter described, is drivably connected to a gear box 14 to cause rotation of blades 16 about their axes to vary the pitch thereof. It is, of course, to be understood that other pitch controlling devices may be used in lieu of the gear box and motor without departing from the spirit of the invention.

It is common practice in aircraft construction and design to drive an alternator 18 from a cam shaft 20 to supply power for instrumentation purposes. The alternator is equipped with a permanent magnet 22 driven by the cam shaft, and includes a three phase winding 24. The output voltage and frequency of the alternator are proportional to engine speed. Inasmuch as the alternator capacity is more than adequate for instrumentation purposes, the output of the alternator is connected to a synchronizing apparatus for a purpose yet to be described.

The governor-synchronizer apparatus is a device constituted to produce a selected standard frequency which represents a predetermined speed with which the engines are to be synchronized by means hereinafter described. For the purpose of simplicity one engine and one synchronizer device contained within the dotted outline 26 has been shown, but it is to be understood that each engine has an engine synchronizer. A single electronic master governor including power supply for the engine synchronizers is contained within the dotted outline 28. A second engine, not shown, has its synchronizer connected in parallel with the synchronizer 26 through connections C.

The electronic master governor 28 is manually controlled for preselecting a standard speed reference with which the engines are to be synchronized. That is, the governor provides means for establishing a standard speed reference to which all engines are governed. The master governor 28 comprises a bridge-type feed-back oscillator having tubes VT₁ and VT₂ arranged in the circuit to produce frequency of oscillations in a manner known to the radio art. The tube VT₂ acts as a phase invertor and is necessary to make the feed-back voltage of correct phase to give regenerative feed-back. Degenerative feed-back is applied to the amplifier through a variable resistor 30 forming one leg of a resistance-capacitance bridge used for tuning the oscillator. Regenerative feed-back is fed to the amplifier through a variable resistor 32 and a condenser 34 in series therewith, both of which are located in another leg of the bridge. A third leg of the bridge includes a resistor 36, a fourth leg of the bridge includes a variable resistor 38 and a condenser 40 arranged in parallel. The frequency of oscillation of the circuit is determined by the two variable resistors 32 and 38 which are constructed for simultaneous operation by handle 42. The arrangement of the handle and resistors is such that preselected standard speed references may be established by manually positioning the handle. One side of the oscillator output is connected to a potentiometer 44 ganged with the two variable resistors 32 and 38 and includes a connection 46 to the synchronizer 26 to feed the frequency of oscillation thereto. Wire 47 is the other side of the oscillator output. A second potentiometer 48 is likewise operated by movement of handle 42 for a purpose to be hereinafter described. The arrangement of the resistors 32 and 38 and potentiometers 44 and 48 in the manner shown provides a speed selector gang control. The tube VT₃ is arranged in circuit with the oscillator to act as an output amplifier to isolate the synchronizer load circuits from any influence on the oscillator.

The power supply for the oscillator is obtained from a transformer 50, the primary of which is connected to a 115 volt 400 cycle circuit which forms a part of the aircraft electrical system. A full wave rectifier tube VT₄ and filters therefor, including a choke 52, and condensers 54 and 56 are located in the power supply to provide direct current for the anodes.

The secondary winding 58 of the transformer supplies the filament power for all tubes of the cathode heater type in the governor and synchronizer.

The synchronizer is divided into two sections or electrical networks, one of which comes into operation when the speed error between the engines and the standard speed reference established by the oscillator is small, and the other of which comes into operation when the speed errors are large. Either section may be used to synchronize the engines independent of the other depending upon the desired exactness of engine synchronization.

The network for synchronizing small speed errors will be considered first and comprises a rectifier tube VT₅ which in conjunction with condensers 60 and 62 and load resistor 64 forms a voltage doubler to thereby increase the rectified or direct voltage. Since this network is responsive to small speed errors, it will be termed the precise slip circuit. Output voltage $E_s$ of the oscillator is connected in series with a voltage $E_1$ measured across one phase of the alternator 18 and a center tap 66 of a Scott type transformer 68 used for transmuting the three phase output of the alternator to two phase. The vector sum or resultant of voltage $E_s$ and $E_1$ are represented as $E_b$ and measured across the network as shown. The frequency of voltage of $E_b$ is the slip or beat frequency which is the measure of the speed difference between the oscillator and alternator frequencies. When the alternator speed is synchronized with the standard reference speed of the oscillator, the beat voltage or beat signal will be constant, as will be explained hereinafter in more detail.

In order to determine the direction of the speed error, that is, the overspeed or underspeed of the alternator with respect to the standard speed reference of the oscillator, sensing means is provided in circuit with transformer 68 and the oscillator output. The sensing means includes a tube VT₇ having a grid 70 connected to the oscillator output through a resistor 72, an anode 74 connected to the winding 76 of the transformer 68, and a cathode 78 connected to the oscillator output and to the winding 76 in the manner shown. The voltage E, measured between the center tap 66 and that phase of the alternator not in circuit with the transformer 68, is 90° out of phase with the voltage $E_2$ which is in phase with the primary voltage. The voltage $E_2$ is applied to the cathode 78 and anode 74 through a load resistor 82 and a condenser 84 in parallel with the resistor. A differentiator circuit is connected across the load resistor 64 with its output connected to grids 86 and 88 of control tube VT₆. The differentiator circuit includes two condensers 90 and a pair of resistors 94 and 96 in series with each of the grids 86 and 88. Resistors 92 are connected in series with the resistors 94 and 96 and grids 86 and 88, respectively. The control tube VT₆ has anodes or plates 95 and 97 connected to the ends of windings 98 and 100 of a magnetic amplifier 102. The other ends of the windings are connected to a common point 104 which in turn is connected to the primary of the power transformer 50. The magnetic amplifier also includes the primary windings 106 and secondary windings 108 to which motor 12 is connected. Since the power supply in this case is single phase, a condenser 110 is disposed in the motor connections to produce a quadrature current for operating the two phase motor 12. The principle of operation of the magnetic amplifier is known to those skilled in the art, and since it per se forms no part of the present invention a detailed discussion of the device is believed unnecessary. However, it might be well to point out that the control tube VT₆ governs the differential current passing through the windings 98 and 100 to thereby control the primary impedance of the two halves of the magnetic amplifier and consequently its output to the motor 12. Obviously the magnetic amplifier is sensitive to the differential of current in the two sides of control tube VT₆.

The network for synchronizing large speed errors will now be considered. This network might properly be termed the approximator circuit since it is here used to synchronize the engines within a certain predetermined speed error at which time the precise circuit takes over. The approximator circuit of network includes a transformer 114 having a primary winding connected to the potentiometer 48. The potentiometer is connected to the primary of the supply transformer 50 in any suitable manner consistent with the desired function. The wiper arm 48a of the potentiometer 48 is arranged to select a fractional part of the voltage dependent upon speed desired, and to distribute this voltage to the primary of transformers 114, one of which is associated with each synchronizer.

A rectifier tube $VT_8$ has one side connected to the secondary of transformer 114 and the other side connected to the alternator transformer 68. The rectified outputs of the tube $VT_8$ are fed into a filtering circuit having condensers 116, 118 and 120 and resistors 122, 124 and 126. The load resistor 126 is constituted for adjustment at the time of installation to match the alternator output characteristic. The filered outputs from each side of the tube are connected differentially in series through resistors 128 and 130 and applied to the grids 132 and 134, respectively, of a control tube $VT_9$ in parallel with tube $VT_6$.

Here, as in the case of the tube $VT_6$, the magnetic amplifier is sensitive to the differential current in the two sides of the control tube $VT_9$. Inasmuch as the approximator circuit as presently used is not intended to respond to small speed errors, the bias voltage of $VT_9$ is somewhat higher than would be desirable for more sensitive operation. Under these conditions the tube is relatively insensitive to small signals, as a result of small speed errors.

Before discussing the general operation of apparatus, it will be well to describe in detail the principle of operation of the slip and sensor circuits which form a part of the precise circuit. The object is to mix the standard speed reference or oscillator frequency having a voltage $E_s$ with the alternator frequency having a voltage $E_1$ and to differentiate the resultant of these two voltages with respect to time to determine the rate of change of the rectified voltage $E_b$. The existence of such a time derivative is a measure of the speed error, and if observations be confined to a definite portion of the beat cycle as hereinafter described, the sense or polarity of the time derivative defines the direction or sense of the speed error.

Referring now to Figure 2 it will be observed that over an entire beat cycle, the voltage $E_b$ will increase for a time and then decrease regardless of the direction of speed error. Note that on the vector diagram, Figure 2, taking $E_1$ as a reference, if the oscillator voltage $E_s$ is of higher frequency than the alternator voltage $E_1$, $E_s$ can be considered to be drifting in a counter-clockwise direction. Under these conditions, as shown on the diagram, the beat voltage $E_b$ will be increasing in the top half and decreasing in the bottom half of the diagram. Also if the oscillator voltage $E_s$ is of lower frequency than the alternator voltage $E_1$, $E_s$ can be considered to be drifting in a clockwise direction. It is obvious that since there is an increase and decrease in $E_b$ over complete cycle regardless of whether the engine is overspeed or underspeed, means must be provided to determine the sense or direction of the error. Operation of the control tube $VT_6$ is made responsive only during the time the vectors are in the upper half of the vector diagram. That is, for underspeed $E_b$ in the top half of the diagram is always going to be increasing; conversely, $E_b$ will always be decreasing for overspeed. It is the purpose of the sensor circuit to confine the observations and response of the control tube $VT_6$ to one half of the diagram—the top half in the present example. Although it is a bit unorthodox to represent rotating vectors of different frequencies on the same diagram, it is done here in the interest of simplicity and clearness. It must be borne in mind that one of the vectors must be considered as drifting about the diagram. In the present illustration $E_s$ is considered as the drifting vector although actually $E_1$ and $E_2$ are the vectors which drift, since the frequencies of the two latter voltages vary with engine speed, while $E_b$ is constant for a given speed setting of the oscillator.

As aforementioned, $E_1$ will be considered as the reference voltage with $E_s$ at a frequency slightly different from $E_1$. $E_s$ can be considered as drifting about the center of the diagram with its end and the end of $E_b$ or beat voltage vector, describing a circular locus O. In the diagram, when the vectors are in the upper half, beat voltage is increasing when $E_s$ is overspeed and decreasing when underspeed. The reciprocal relation obtains in the lower half of the diagram. When the speeds or frequencies are synchronized, there is no relative motion between the various vectors and the beat voltage $E_b$ is constant. It is important to note that if we consider the time derivative or rate of change of the vector $E_b$, its magnitude indicates the amount of speed error and if the apparatus observes this vector only when it is in a given half of the diagram—in this case the upper half—its sense or polarity indicates the direction of the speed error. The sensor circuit including tube $VT_7$ limits action of the control tube $VT_6$ to one-half of the diagram and suppresses action in the other half. If the plate and grid potentials of the plate 74 and grid 70 are both alternating voltages, the plate current can be entirely suppressed only when the two potentials are exactly 180° out of phase. For any other phase relation there will be a portion of the cycle for which both anode and grid potentials are simultaneously positive, permitting the anode to conduct. The grid 70 receives its alternating potential from the oscillator; and the plate 74 receives its alternating potential from the alternator and is represented by $E_2$ on the diagram, 90° out of phase with $E_1$. The load resistor 82 placed in the anode circuit develops a bias voltage which is used to suppress operation of the control tube $VT_6$ except when the vector is in the upper portion of the vector diagram.

To center the operational region of the control tube $VT_6$ in the upper half of the vector diagram, I utilize the reference vector $E_2$, which is $E_1$ rotated through 90°. As already pointed out this out of phase component $E_2$ is obtained through the Scott transformer 68.

The cardioid F of Figure 2 shows the variation in magnitude of the output voltage of the sensor circuit as applied to the grids 86 and 88 of the tube $VT_6$. As shown on the diagram at K when the potentials of grid 70 and anode 74 are 180° out of phase, no current flows in the anode circuit, hence no bias voltage is developed across the load resistor 82. However, as the two potentials approach an inphase relationship, the bias voltage developed becomes greater and greater until a maximum is reached at M. In the present illustration the precise circuit is adapted to respond to speed errors of several hundred R. P. M., or less as determined by the discharge characteristics of the condenser 84 through resistor 82. The approximator circuit is designed to respond to speed errors greater than a few hundred R. P. M. and its present use is such that it will synchronize the engines to within a predetermined range at which time the precise circuit will take over.

Operation of the apparatus is as follows:

It will be assumed that the speed error is more than several hundred R. P. M. so that the approximator circuit must come into action. Use of the approximator method or what may be termed the alternator voltage comparison method is quite satisfactory where greater sensitivity is not necessary. The reference voltage with which the alternator voltage is compared is taken from the potential 48 of the speed selector gang control. This reference voltage represents a preselected standard speed reference corresponding to the standard speed reference developed by the oscillator. This reference voltage, which has a magnitude depended upon the speed selected, is applied to the transformer 114. The secondary of the transformer and the alternator voltage are fed through the rectifier tube $VT_8$. The outputs of this rectifier tube $VT_8$ are differentially connected and applied to the grids of control tube $VT_9$. The control tube governs the energy supplied to the motor 12 within a predetermined range of synchronization at which time the approximator circuit relinquishes control to the precise circuit.

With the precise circuit in operation, the rectified beat voltage of the combined alternator and oscillator output appears across the resistor 64. If the engine speeds are exactly synchronized, this beat voltage is constant but if slip exists, as evidenced by a change of $E_b$, the voltage will either increase or decrease depending on the existing vector relations. The capacitors 99 which are of the same capacitance serve as differentiators to observe the rate of change of voltage. Any rate of change will result in capacitor charging current, which passes through the current-measuring load resistors 94 and 96 impressing a signal voltage on the grids of control tube $VT_6$. Since the grids of tube $VT_6$ are also in series with the output voltage developed in the anode circuit of tube $VT_7$, this voltage biases tube $VT_6$ to current cut-off so that it is rendered inoperative. However, when the vector relations are correct, that is, in the upper half of the diagram, with $E_8$ and $E_2$ nearly out-of-phase, the sensor voltage vanishes to thereby allow the control tube $VT_6$ to function in accordance with the rate of change of $E_b$ whereby the motor is controlled.

Although this invention has been described in connection with certain specific embodiments, the principles are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. An apparatus for correcting speed errors between an engine and a preselected speed reference comprising means for producing a signal which is a measure of engine speed, an oscillator for producing a signal which is a measure of a preselected standard speed reference, manual means for changing the standard speed reference, means interconnected with the oscillator and said first mentioned means for creating a rectified beat signal, a mechanism affecting the engine speed for causing the same to seek the speed corresponding to the preselected speed reference, a precise network for synchronizing speed errors within a preselected range comprising electrical connections to said mechanism, said network provided with a thermionic tube having a pair of grids, means in circuit with the grids for determining the rate of change of the beat signal and impressing the same on the grids, a sensor circuit provided with a control tube having a grid connected to the oscillator and having an output voltage which is impressed on said pair of grids in a manner to limit the operation of the thermionic tube to times when the beat signals are in correct vector relations, and an approximator network connected to said mechanism for reducing the speed errors to within the aforesaid preselected range at which time said precise network assumes control.

2. An apparatus for maintaining an aircraft engine synchronized with a preselected speed reference comprising means for producing a signal representing a selected speed reference, means for producing a signal representing engine speed, means sensitive to the algebraic sum of the signals when the difference in the selected speed reference and the engine speed is within a first predetermined range for reducing the speed difference, and means sensitive to the rate of change of the vector sum of said signals when the difference in the selected speed reference and the engine speed is within a second predetermined range for further reducing the speed difference.

3. An apparatus for maintaining an aircraft engine synchronized with a preselected speed reference comprising manually controlled means for establishing a signal which represents a desired engine speed, means for producing a signal which represents actual engine speed, means responsive to the algebraic sum of the signals when the difference in the preselected speed reference and the engine speed is within a first predetermined value, for reducing the speed difference, and means responsive to the rate of change of the vector sum of said signals only when the difference in the preselected speed reference and the engine speed is a second predetermined value, for further reducing the speed difference.

FRANKLIN O. WISMAN.

REFERENCES CITED

The following references are of record in the file of this patent:

UNITED STATES PATENTS

| Number | Name | Date |
|---|---|---|
| 2,382,847 | Baumann | Aug. 14, 1945 |
| 2,408,451 | Sorenson | Oct. 1, 1946 |